(12) United States Patent
Hosomi et al.

(10) Patent No.: US 6,731,846 B2
(45) Date of Patent: May 4, 2004

(54) DISPERSION COMPENSATOR AND OPTICAL TRANSMISSION SYSTEM USING SAME

(75) Inventors: Kazuhiko Hosomi, Kokubunji (JP); Toshio Katsuyama, Ome (JP); Young-kun Lee, Hachioji (JP); Masahiro Ojima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 09/941,697

(22) Filed: Aug. 30, 2001

(65) Prior Publication Data

US 2002/0172456 A1 Nov. 21, 2002

(30) Foreign Application Priority Data

May 11, 2001 (JP) ........................ 2001-141290

(51) Int. Cl.⁷ ............................. G02B 6/02; H04J 14/02
(52) U.S. Cl. ................... 385/123; 385/124; 385/24; 385/27; 385/28; 398/81
(58) Field of Search ................. 385/123, 124, 385/125, 126, 24, 25, 26, 27, 28; 398/81, 158

(56) References Cited

U.S. PATENT DOCUMENTS

| | | | | |
|---|---|---|---|---|
| 5,802,236 A | * | 9/1998 | DiGiovanni et al. | 385/127 |
| 6,097,870 A | * | 8/2000 | Ranka et al. | 385/127 |
| 6,243,522 B1 | * | 6/2001 | Allan et al. | 385/123 |
| 6,334,017 B1 | * | 12/2001 | West | 385/123 |
| 6,433,919 B1 | * | 8/2002 | Chowdhury et al. | 359/332 |
| 6,445,862 B1 | * | 9/2002 | Fajardo et al. | 385/125 |

OTHER PUBLICATIONS

Hosomi et. al., "Dispersion Compensator . . . " Pub. No.: U.S. 2002/0172456A1, published Nov. 21, 2002.*

* cited by examiner

*Primary Examiner*—Brian Healy
(74) *Attorney, Agent, or Firm*—Antonelli, Terry, Stout & Kraus, LLP

(57) ABSTRACT

The present invention aims to provide a dispersion compensator which is ultra small in size and low in cost and capable of controlling dispersion compensating values, and an optical transmission system using the dispersion compensator. A dispersion property of light that propagates through defects in a photonic crystal, is used to compensate for each wavelength dispersion. A dispersion compensator comprises a dispersion-compensating-waveguide array in which a plurality of dispersion compensating waveguides having dispersion compensating values different from one another are placed, a drive unit for driving the dispersion-compensating-waveguide array, and optical fibers for inputting/outputting a light signal. Each of the dispersion compensating waveguides comprises regular waveguides and a waveguide made of defects in photonic crystal. The lengths of the waveguides made of the defects in photonic crystal are changed one by one to make dispersion compensating values different from one another.

8 Claims, 12 Drawing Sheets

DISPERSION COMPENSATOR AND OPTICAL TRANSMISSION SYSTEM USING SAME

BACKGROUND OF THE INVENTION

The present invention relates to a dispersion compensator suitable for use in an optical communication system, for compensating for wavelength dispersions of a transmission medium such as an optical fiber or the like in an optical pulse transmission path.

In an optical transmission system, a high-purity silica optical fiber is normally used as a transmission medium for a light signal. However, since the optical fiber has a wavelength dispersion, a pulse waveform is degraded when a light signal pulse having predetermined wavelength broadening is transmitted. The degradation of the light pulse waveform due to the dispersion of the optical fiber becomes a big factor that will restrict a transmission distance and transmission capacity of the optical transmission system. Therefore, the technology of canceling out such a wavelength dispersion becomes important for the large-capacity optical transmission system. If, for example, an optical system having the dispersion of the optical fiber and its reverse dispersion is inserted into an optical transmission path, then the dispersions of the optical fiber are canceled out so that the degraded waveform can be recovered or made up.

As the prior art, a technology for compensating for dispersions by use of a fiber (dispersion compensating fiber) having dispersions reverse in sign and large in absolute value has been put into practical use. The dispersion compensating fiber has been widely used because it has such characteristics that it is capable of realizing a desired characteristic with satisfactory reproducibility and has a wide compensable band, for example. However, a dispersion compensating value per unit length of the dispersion compensating fiber is as low as about −20 ps/nm/km. If one attempts to obtain a desired dispersion value, then a very long fiber is needed. Therefore, a problem arises in that it cannot be brought into less size and becomes high in cost.

As a recent technology which aims to scale down a dispersion compensator, there has been proposed a dispersion compensator using a multidimensional structure of two or more types of mediums different in refractive index, i.e., a photonic crystal. It is known that light transmitted through the photonic crystal exhibits a peculiar dispersion characteristic. When a suitable lattice structure, a cycle or period, and the difference in refractive index between the mediums are selected with respect to light having a desired wavelength, a large dispersion can be obtained. A specific example thereof has been disclosed in Japanese Patent Application Laid-Open No. 2000-121987. The present dispersion compensator is one wherein a two-dimensional photonic crystal is formed on an Si (Silicon) substrate to compensate for dispersion. The dispersion compensator is capable of obtaining a few tens of +ps/nm with a length of 5 mm.

However, the light that propagates through the two-dimensional photonic crystal, cannot avoid losses produced due to it scattering. The example disclosed in Japanese Patent Application Laid-Open No. 2000-121987 did not taken into consideration the insertion losses. Further, when the dispersion relations of the photonic crystal are used, a part of a complex dispersion curve is locally used. An extremely high degree of production accuracy is required to obtain desired performance, and the degree of freedom of design of the dispersion compensator is limited.

As described in the prior arts, there are known ones in which dispersion compensation for long-distance optical fiber communications has already been put into practical use. However, a dispersion compensator small in size and low in cost has not yet been realized.

With an increase in transmission capacity, there has been a need to use a large number of channels in higher density and over a wide range of wavelength regions or bands. Correspondingly, there is a need to assure wavelength dispersions more accurately. Further, a problem arises in that wavelength dispersions change with time due to a change in physical-property constant or the like with a variation in outside-air temperature. However, the conventional dispersion compensating system provides a fixed compensable dispersion value and is hence not capable of compensating for wavelength dispersions in an optical fiber, which change momentarily. In order to cope with such a problem, there has been a demand for a dispersion compensator capable of changing a compensation value flexibly and accurately according to conditions.

SUMMARY OF THE INVENTION

Thus, an object of the present invention is to provide a dispersion compensator which is ultra small in size and low in cost, and is capable of changing a dispersion compensating value, and an optical transmission system using the same.

In a dispersion compensator according to the present invention, defect modes of a photonic crystal are used to configure a waveguide having coupled microcavities or resonators, and a dispersion property of light that propagates through such a waveguide, is used to compensate for each waveform dispersion.

Upon the occasion of description of the principle and effects of the present invention, a description will first be made of the principle of allowing each defect in photonic crystal to function as a microcavity. Next, the concept and propagation characteristic of the waveguide having the coupled microcavities will be demonstrated and the principle of dispersion compensation using it will be explained.

The photonic crystal is a multidimensional periodic structure comprising combinations of two or more mediums different in refractive index. FIG. 2 shows an example of one called a "two-dimensional photonic crystal" of photonic crystals. FIG. 2 is a cross-sectional view of a structure which includes periodic structures as viewed in the direction horizontal to the sheet and vertically-extending structures are uniform. Columns each having a dielectric constant $\epsilon_2$ are disposed in a medium having a dielectric constant $\epsilon_1$ in a triangular lattice form ($\epsilon_1 > \epsilon_2$). When each columnar portion is hollow, $\epsilon_2 = 1$. In FIG. 2, a indicates a lattice constant, and r indicates the radius of each column.

A diagram showing the relationship between a wave number of light propagating through a photonic crystal and the frequency thereof is called a photonic band chart. FIG. 3 is a photonic band chart relative to a TM mode when $\epsilon_1 = 3.5$, $\epsilon_2 = 1$ and $r/a = 0.45$ in the structure shown in FIG. 2. Here, the TM mode indicates a mode in which an electric field is vertical to the sheet. The vertical axis indicates a normalized frequency ($\omega a / 2\pi c$), and the horizontal axis indicates a wave vector ($ka/2\pi$) normalized within a first brillouin zone. c indicates a light velocity in vacuum, $\omega$ indicates an angular frequency of the light and k indicates a wave number, respectively. The triangular lattice of FIG. 2 corresponds to a hexagonal symmetry. A formed brillouin zone is an orthohexagonal structure shown in FIG. 3. The apex of the orthohexagon is a point K, the midpoint of each side is a point M, and a point where a wave number is 0, is a point Γ, respectively.

As diagonally shaded in FIG. 3, no band exists in a specific (normalized) frequency region over the whole region or band of the first brillouin zone. This means that light having a frequency corresponding to this band cannot propagate through a photonic crystal. Such a frequency band in which the propagation is prohibited, is called a "photonic bandgap". For example, when light having a wavelength corresponding to a bandgap is launched into a crystal from outside, it is fully reflected.

Now consider where point defects, i.e., ununiform elements in periodic structures are introduced into a photonic crystal having a bandgap. Since the periodic structures are out of order at the defective portions, the band chart shown in FIG. 3 is not applied and even light having a bandgap wavelength can exist. Since, however, the periphery of the defect is of the perfect photonic crystal, the light cannot propagate toward the outside and is hence reflected toward the interior of the defect. FIG. 4 conceptually shows the manner at this time. On the other hand, a point defect and a photonic crystal lying therearound form a microcavity. The light is multi-reflected thereinside and placed in a confined state, so that it forms a steady state. The steady state of the light within the defect of the photonic crystal is called a "defect level".

Since there is a need to fully reflect the light by the peripheral photonic crystal with a view toward operating each defect as the microcavity, the defect level always depends on the frequency corresponding to the bandgap. As a specific form of each defect, there is generally known such a form that the diameter of a column (or hole) having $\epsilon_2$ is changed. In the defect shown in FIG. 4, the diameter of one column can be regarded as 0. However, even if the diameter thereof is made large, the defect level is formed. In either case, no specified process technology is required for the fabrication of each microcavity so long as the technology of forming the photonic crystal is adopted. A plurality of microcavities can also be fabricated on the same plane.

If the defect of the photonic crystal is used as described above, then each microcavity simple in structure can be fabricated with relative ease and arbitrarily in regard to the density and position. Such a feature is extremely suitable for the fabrication of coupled-microcavity waveguide to be described below.

The characteristic of the coupled-microcavity waveguide has been described in, for example, "Optics Letters, Vol. No. 24, pp. 711". FIG. 5 typically shows the manner of the propagation of light used therein. As shown in the drawing, the coupled-microcavity waveguide is a structure wherein microcavities each having a resonant frequency (i.e., frequency of localized mode) Ω are disposed in continuous connection with one another at predetermined intervals Λ. Normally, the light is repeatedly internally reflected in the microcavities to thereby form a standing wave. When an ideal microcavity exists in isolation, photons are confined thereinside and no leak to the outside.

However, when another microcavity is placed at a suitable distance, a spatial distribution of light confined in a microcavity I and a spatial distribution of light confined in a microcavity II overlap each other. It is therefore possible to transfer energy between the two microcavities. Thus, the transfer of the energy between the microcavities refers to "two microcavities are coupled to each other".

When a large number of microcavities are arranged as shown in FIG. 5 in a state in which the two adjacent to each other are connected to each other, the above-described energy propagation is continuously repeated and an incident pulse propagates through the microcavities one after another. This results in the principle of the coupled-microcavity waveguide.

The propagation characteristic of light in the coupled-microcavity waveguide has been well described by "Tight Binding Approximation" that light is tight bound with each microcavity and it interacts with only a microcavity adjacent thereto. Assuming that the resonant frequency of each microcavity is defined as Ω, and the angular frequency of the light that propagates through the coupled-microcavity waveguide is defined as ω, the following relation is established under the "Tight Binding Approximation".

$$\omega = \Omega(1 + \kappa \cos(k\Lambda)) \quad (1)$$

where κ indicates a value related to the strength of the interaction between the microcavities and indicates a constant determined by the structure of the microcavity, the distance between the microcavities, etc. k indicates a wave vector of the light lying in the coupled-microcavity waveguide. It is understood that as represented by the equation (1), ω takes or assumes each value in a range equivalent to (1±κ) times of Ω.

A group velocity Vg of the light that propagates through the coupled-microcavities, is represented by the following equation (2).

$$Vg = d\omega/dk = -\kappa\Lambda\Omega\sin(k\Lambda) \quad (2)$$
$$= \Lambda\Omega(\kappa^2 - (\omega/\Omega - 1)^2)^{1/2}$$

It is understood from the equation (2) that the absolute value of the group velocity takes a maximum value κΛΩ when ω=Ω, whereas when ω=(1±κ)Ω, it assumes a minimum value 0. In general, a wavelength dispersion D is defined by the following equation:

$$D = d(1/Vg)/d\lambda \quad (3)$$

It is understood from the equation (3) that the dispersion is an inclination to a wavelength change in the inverse 1/Vg of the group velocity. The manner in which the inverse 1/Vg of the absolute value of the group velocity is defined as a λ function, is shown in FIG. 6. $\lambda_0$ indicates the wavelength of light when ω=ω. $\lambda_1$ and $\lambda_2$ indicate light's wavelengths when ω=(1±κ)Ω. As shown in the drawing, 1/Vg results in such a downwardly-extending convex form that it becomes infinity at $\lambda_1$ and $\lambda_2$ and it takes a minimum value 1/κΛΩ at $\lambda_0$.

As represented by the graph of FIG. 6, the inclination of 1/Vg extends from minus infinity to 0 and continuously changes up to plus infinity. Thus, when it is applied to the dispersion compensator, it has a feature that a very large dispersion is obtained in the first place and necessary dispersion values can arbitrarily be selected inclusive of the positive and negative of a sign in the second place.

Further, the loss incident to the propagation is not produced in principle. Since the light propagates even in actuality in a state of being tightly confined in a narrow region, the loss thereof due to its scattering or the like is expected to be extremely low. Further, since the light is tightly confined in each microcavity per se, there is no need to newly form a waveguide structure, and a dispersion compensator can be fabricated by a simple process.

The present invention relates to a dispersion compensator which makes use of the dispersion characteristic of light that propagates through each defect in the photonic crystal described above and compensates for wavelength dispersions developed in an optical pulse transmission path. The dispersion compensator according to the present invention is large in wavelength dispersion value in this way and obtains a necessary dispersion compensating value with an extremely small size. The dispersion compensator can be brought into a downscale of a few hundredths or less as compared with a conventional one under a structure excluding a drive unit, etc., for example. Further, an advantage is brought about in that there is no need to provide a light-confined structure with low loss, and a fabrication process is also easily allowed through the use of a normal semiconductor process technology.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

(First Embodiment)

Figure 1A:
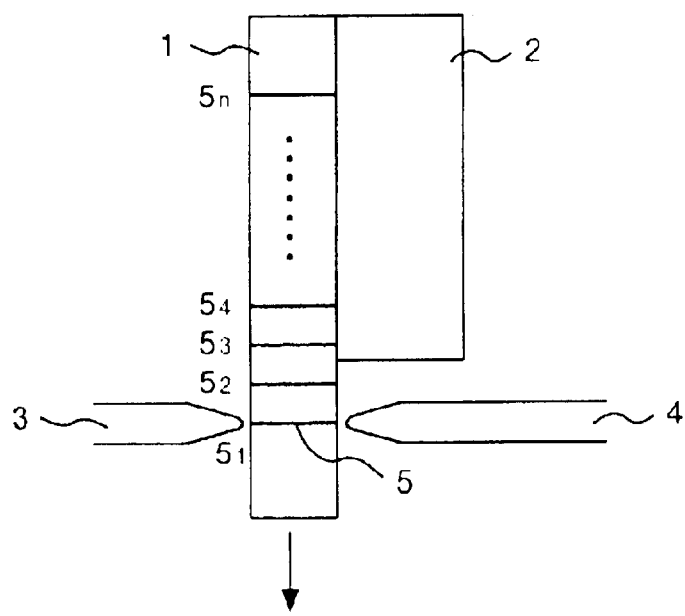
FIGS. 1a to 1c are an external view and an enlarged view for showing a first embodiment of a variable dispersion compensator according to the present invention, and a cross-sectional view taken along line P-P' of FIG. 1b, respectively.
Figure 1B:
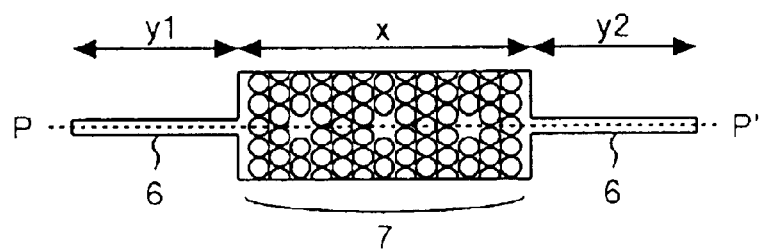
Figure 1C:
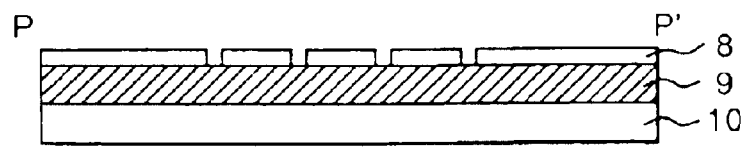

FIGS. 1a to 1c are diagrams showing a first embodiment of a variable dispersion compensator according to the present invention.

FIG. 1a shows an external view of the variable dispersion compensator according to the present invention. As shown in the drawing, the present embodiment comprises a dispersion-compensating-waveguide array 1 in which a plurality of waveguides having dispersion compensating values different from one another are placed, a drive unit 2 for driving the dispersion-compensating-waveguide array 1, and an input-side fiber 3 and an output-side fiber 4 for respectively inputting and outputting a light signal. n dispersion compensating waveguides 5 are disposed on the dispersion-compensating-waveguide array 1. In the drawing, 5n indicates an nth dispersion compensating waveguide.

A structure of each dispersion compensating waveguide 5 is typically illustrated in FIG. 1b in an enlarged form. The dispersion compensating waveguide 5 comprises regular waveguides 6 and a waveguide 7 made of defects in photonic crystal which bears dispersion compensation, both of which are connected in series. In the drawing, the length of the waveguide 7 is represented as x and the lengths of the regular waveguides 6 are represented as y1 and y2 respectively. n dispersion compensating waveguides are identical to one another in the length of x+y1+y2 but different one by one in the length of x. Thus, dispersion compensating values are different from one another. The corresponding dispersion compensating waveguide 5 corresponding to a desired dispersion value, which is selected from the dispersion-compensating-waveguide array 1, is inserted between an input-side optical system and an output-side optical system by a drive system including the drive unit 2 to thereby establish an optical path.

Figure 2:
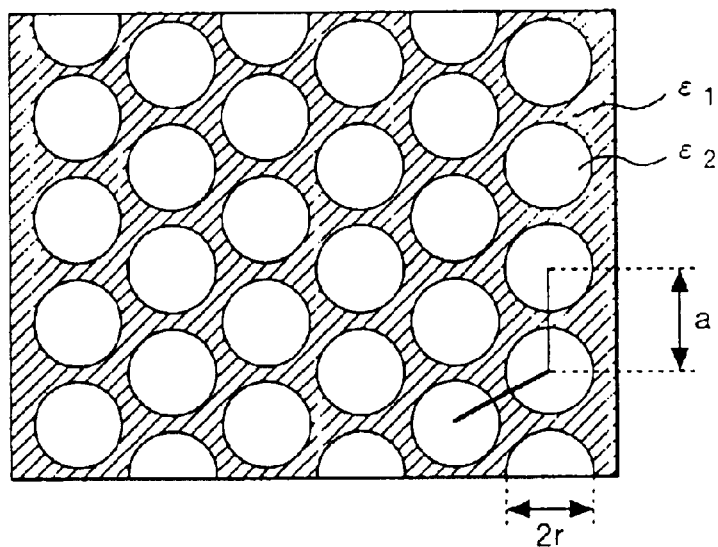
FIG. 2 is a diagram showing a two-dimensional photonic crystal.
Figure 3:
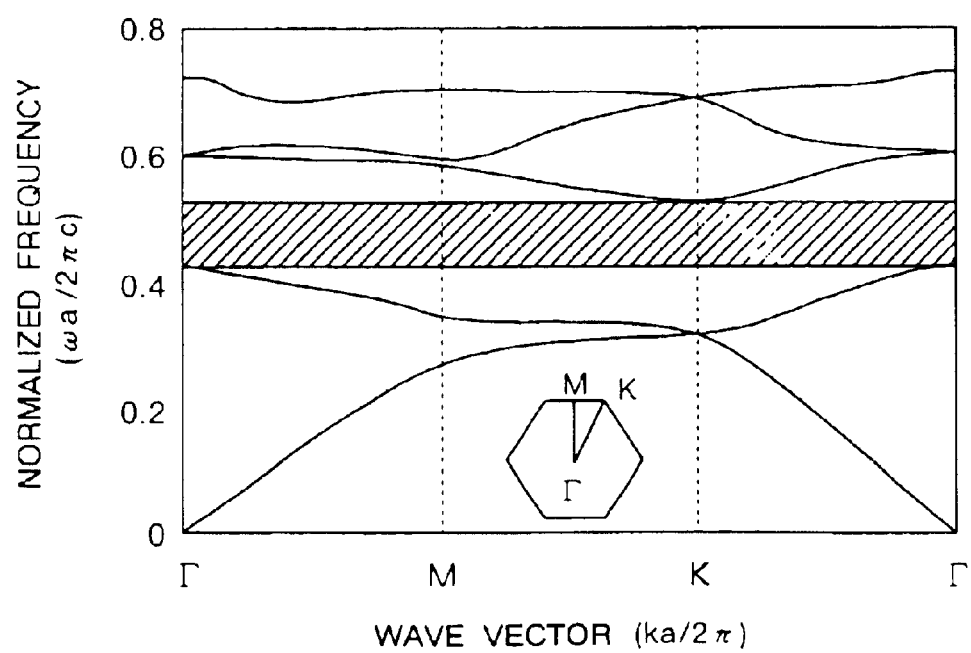
FIG. 3 is a photonic band diagram corresponding to the two-dimensional photonic crystal shown in FIG. 2.

FIG. 1c is a sectional view showing a cross section taken along P-P' of FIG. 1b. An $SiO_2$ layer 9 and an Si layer 8 are successively laminated on an Si substrate 10. Two-dimensional photonic crystals with defects are patterned on the Si layer 8. The thickness of the $SiO_2$ layer 9 is 3 $\mu$m, and the thickness of the Si layer 8 is 0.5 $\mu$m. A structure other than each defective portion of the photonic crystal is of a circular-hole triangular lattice array identical to that shown in FIG. 2. As a lattice interval a, two types of 0.600 μm and 0.608 μm were used. The radius r of each circular hole was set as 0.27 μm in either case.

The cycle or period and structure of each defect are represented as shown in FIG. 1b. The rate of filling of Si in a two-dimensional photonic crystal layer with defects is about 27% and an average refractive index is 1.675. The photonic crystal layer with the defects is interposed between the SiO$_2$ layer 9 having a refractive index of 1.5 and air having a refractive index of 1 and serves as a core having a slab structure. As the regular waveguides 6 connected to both ends of the waveguide 7 made of defects in photonic crystal, Si ridge waveguides were used in the present embodiment. A ridge height was set to 0.5 μm identical to that of the photonic crystal portion, and a waveguide width was set to 0.5 μm.

Figure 7A:
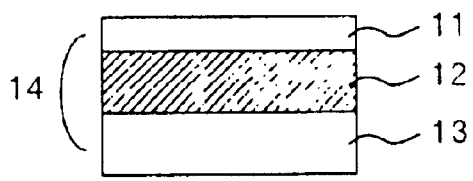
FIGS. 7a to 7f are process diagrams for describing a process for fabricating the first embodiment of the present invention.
Figure 7B:
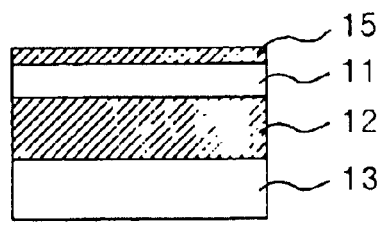
Figure 7C:
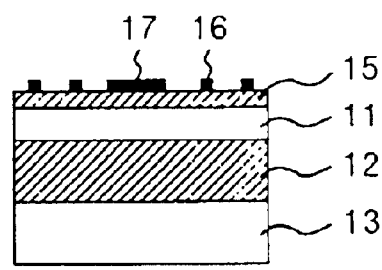

A method of manufacturing a waveguide made of defects in photonic crystal will next be described with reference to FIGS. 7a through 7f. An SOI (Silicon On Insulator: laminated structure of Si/SiO$_2$/Si) substrate 14 was used as a substrate. The SOI substrate 14 comprises a bed Si layer 13, an SiO$_2$ layer 12 having a thickness of 3 μm, and an Si layer 11 having a thickness of 0.5 μm. As shown in FIG. 7b, an SiO$_2$ layer 15 having a thickness of 0.3 μm was first deposited on the SOI substrate 14 by thermal CVD. Next, as shown in FIG. 7c, resist patterns 16 including a defective portion (ununiform element) 17 are formed on the SiO$_2$ layer 15 by electron beam lithography.

Figure 7D:
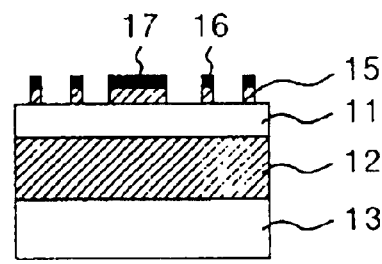
Figure 7E:
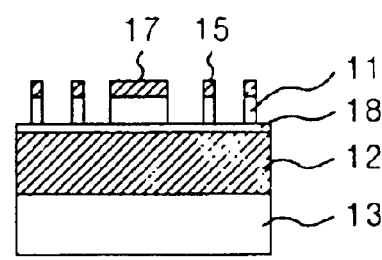
Figure 7F:
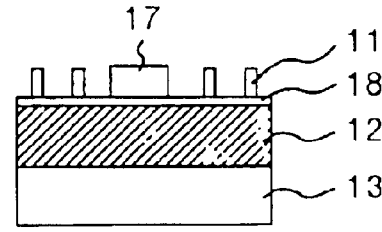

With the resist patterns as masks, the SiO$_2$ layer 15 was etched using RIE (Reactive Ion Etching) as shown in FIG. 7d. After the resist patterns 16 have been removed by oxygen ashing, the Si layer 11 was etched by ECR (Electron Cyclotron Resonance) with the SiO$_2$ layer 15 with the patterns transferred thereto as masks as shown in FIG. 7e. At this time, an Si layer 18 having a thickness of about 0.05 μm was left as an etching protective layer without completely etching the Si layer 11. Finally, a hydrofluoric etching solution was used to remove the SiO$_2$ layer 15, thereby forming such a structure as shown in FIG. 7f. The anteroposterior regular waveguides shown in FIG. 1b are also simultaneously fabricated according to a series of processes.

As described above, the waveguide made of defects in photonic crystal according to the present invention can be fabricated by using the normal semiconductor process technology.

A description will next be made of dispersion compensating capability or power with respect to incident light lying in the neighborhood of 1.55 μm of the present dispersion compensator. As previously mentioned, the dispersion value is given by the equations (2) and (3). Accordingly, the dispersion value can be calculated based on the resonant frequency Ω of each resonator, the defect interval Λ and the coefficient κ.

Figure 8:
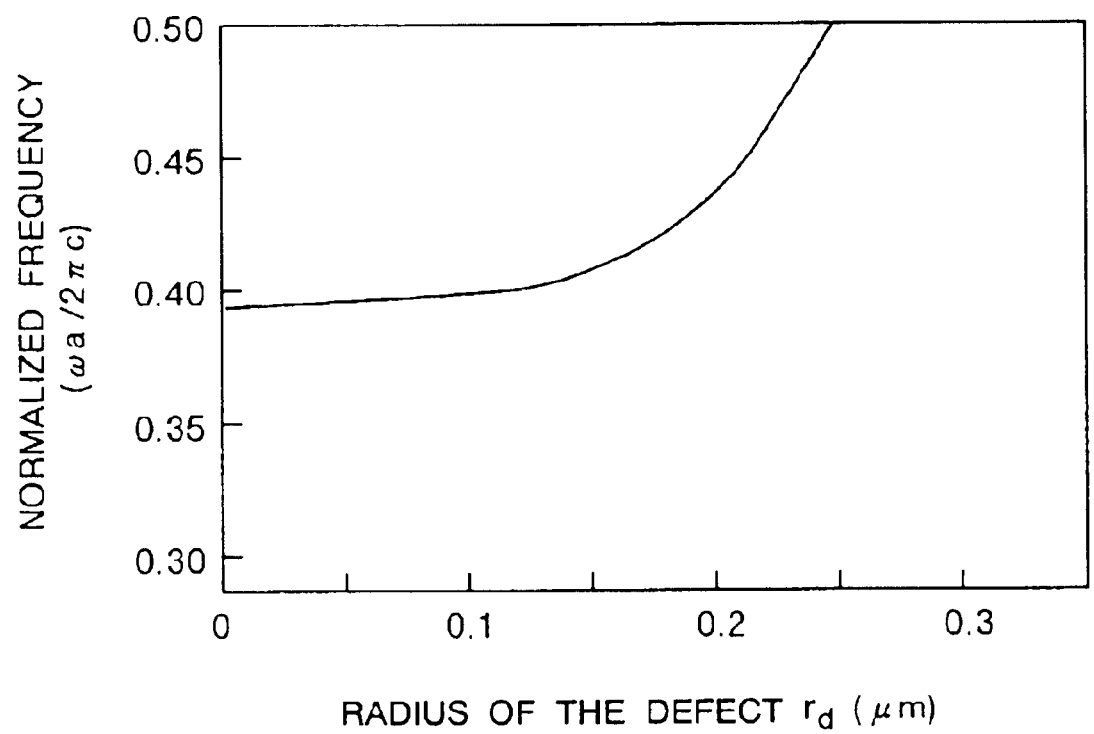
FIG. 8 is a graph showing a defect level which appears in the photonic crystal shown in FIG. 2 when the size of a circular hole is changed.

FIG. 8 is a diagram showing a defect level which appears in the two-dimensional photonic crystal when the diameter of one circular hole is changed. The vertical axis indicates a normalized frequency and the horizontal axis indicates the radius $r_d$ of the changed circular hole. Since a defect is configured as a structure from which one circular hole is completely removed, in the present embodiment, the radius thereof is equivalent to $r_d=0$ in FIG. 8. The corresponding normalized frequency (Ωa/2πc) at this time is 0.39. Namely, the resonant frequency Ω of a microcavity formed by the photonic crystal and its defect is given as Ω=0.39×2πc/a. Λ becomes 2a√3. The value of κ was determined by fitting a measured group velocity to a computational equation. In the present structure, the value of κ was κ=−0.03.

Figure 4:
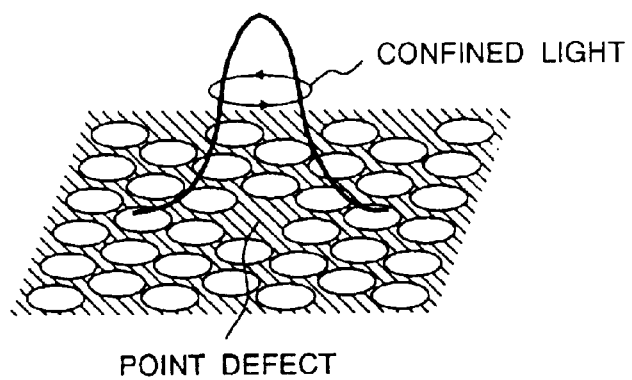
FIG. 4 is a conceptual diagram for describing the manner in which light forms a localizing mode in each defect provided in a photonic crystal.
Figure 5:
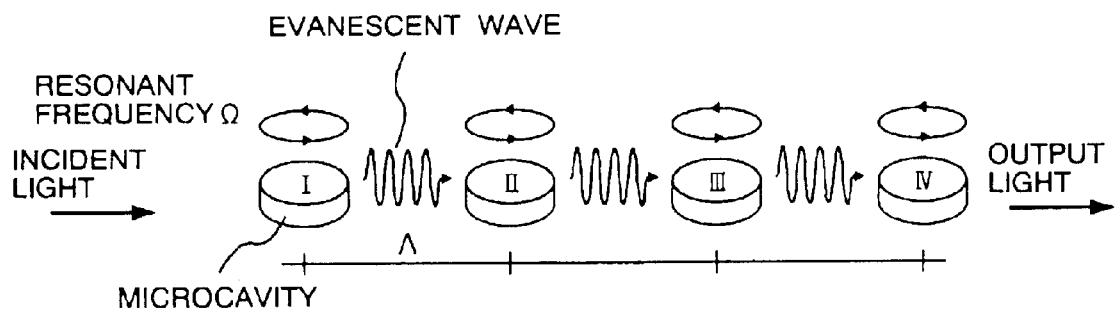
FIG. 5 is a conceptual diagram for describing the manner in which light propagates through coupled microcavities.
Figure 6:
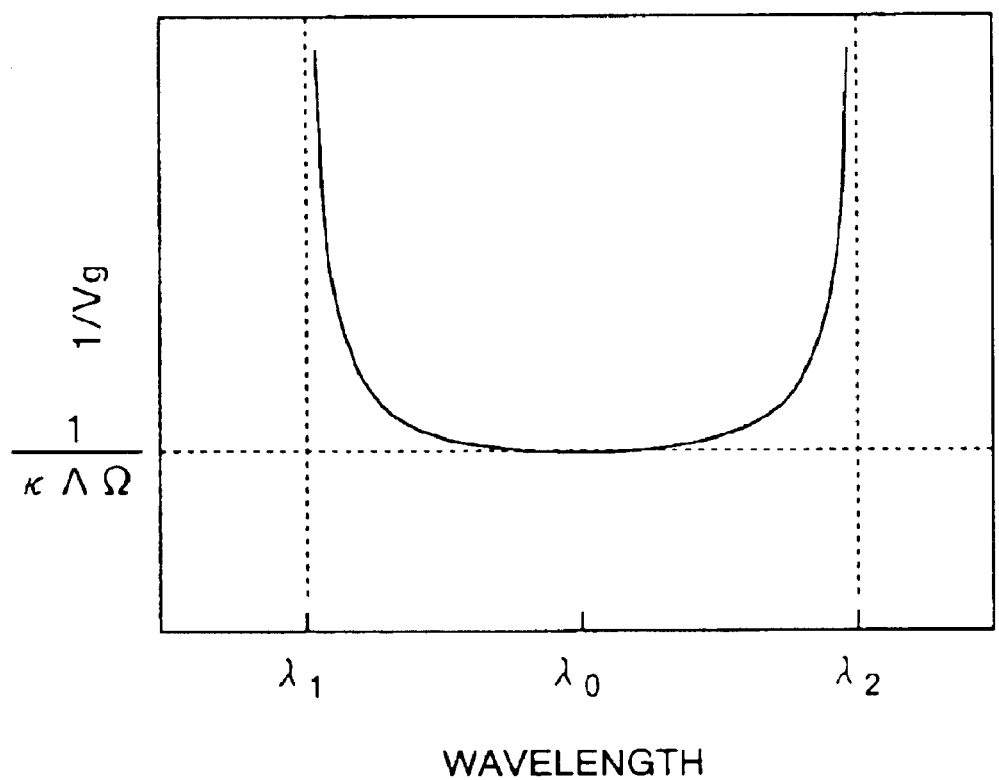
FIG. 6 is a diagram showing 1/Vg of light propagating through each of waveguides for the coupled microcavities as a function of a wavelength.

It is thus understood that the wavelength dispersion value can be controlled even by changing the radius of the circular hole without configuring the defective portion of the photonic crystal as the structure from which such a circular hole as shown in FIG. 4 has completely been removed.

Figure 9:
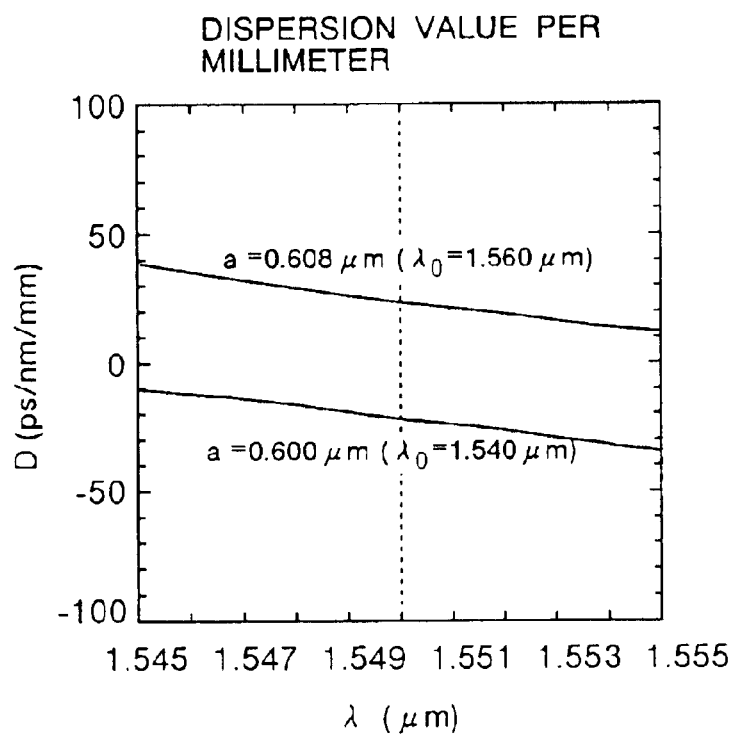
FIG. 9 is a diagram illustrating the dependence of dispersion values of the variable dispersion compensator according to the first embodiment of the present invention on wavelengths.

The dispersion compensating capability obtained in this way is shown in FIG. 9. The vertical axis indicates a dispersion value (D) per millimeter of an element, and the horizontal axis indicates a wavelength (λ). When a =0.600 μm, −20 ps/nm/mm is provided as the dispersion compensating capability with respect to a wavelength of 1.55 μm, whereas when a =0.608 μm, +20 ps/nm/mm is provided as the dispersion compensating capability with respect to the wavelength of 1.55 μm.

In the variable dispersion compensator according to the present embodiment, x+y1+y2 was fixed to 10 mm, x was set to a range of 1 mm to 8 mm set in 1 mm-steps with respect to the respective waveguides of −20 ps/nm/mm and +20 ps/nm/mm. Waveguides (waveguides capable of being substantially regarded as 0 ps/nm/mm in dispersion) made up of the regular waveguides were added to the above and hence the waveguides corresponding to seventeen in total were set up on the array. Accordingly, a variable width of the present variable dispersion compensator ranges from −160 ps/nm to +160 ps/nm, and its resolution is 20 ps/nm.

While the variable width and the resolution have been designed so as to be suitable for an optical transmission system to be described later in a fourth embodiment, it is needless to say that parameters such as the number of the waveguides included in the array, the length of each waveguide, the structure of the photonic crystal, etc. are changed so that one having a desired spec., can be fabricated.

In the present embodiment, the plurality of dispersion compensating waveguides 5 are provided on the dispersion-compensating-waveguide array 1 to provide the variable structure. However, even when only one dispersion compensating waveguide designed so as to be most suitable for the precedently required dispersion value is used, a dispersion compensator drastically brought into less size as compared with the prior art can be provided, whereby a great effect is obtained.

(Second Embodiment)

Figure 10:
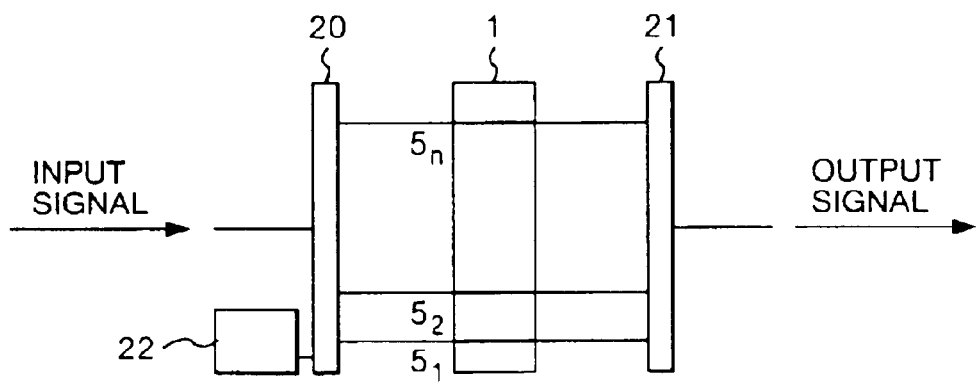
FIG. 10 is a diagram depicting a configuration of a second embodiment of a variable dispersion compensator according to the present invention.

FIG. 10 shows a second embodiment of a variable dispersion compensator according to the present invention. The present embodiment comprises a 1×n type spatial optical switch 20, a switching-control unit 22 and a dispersion-compensating-waveguide array 1 provided on the input side, and an n×1 type optical coupler 22 provided on the output side. A specific configuration of each individual dispersion compensating waveguide is similar to that employed in the first embodiment. In the present embodiment, optical paths are changed over by the optical switch to thereby select the corresponding dispersion compensating waveguide 5 having a desired dispersion value.

(Third Embodiment)

In the first and second embodiments, the length of each dispersion compensation portion is changed to configure the waveguide array having the different dispersion values. Another method of changing dispersion compensating values every waveguides is illustrated by way of example.

Figure 11:
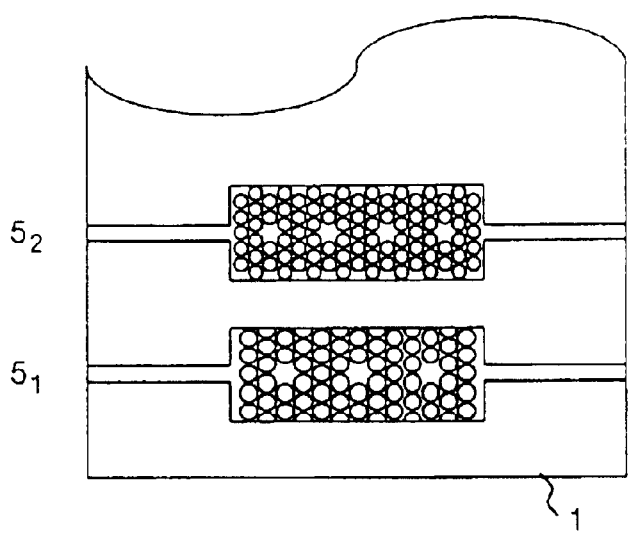
FIG. 11 is a typical diagram showing the conception of a dispersion-compensating-waveguide array according to a third embodiment of the present invention.

FIG. 11 shows a third embodiment of the present invention, which is one showing the manner of a waveguide array in which lattice constants a of photonic crystals of photonic crystal waveguides 7 with defects are different every waveguides. When the lattice constants a are different from one another, the resonant frequencies of individual microcavities, i.e., Ω in the equation (2) change. Thus, the photonic crystal defect waveguides different in hole size are different in dispersion with respect to lights having the same wavelength.

Figure 12:
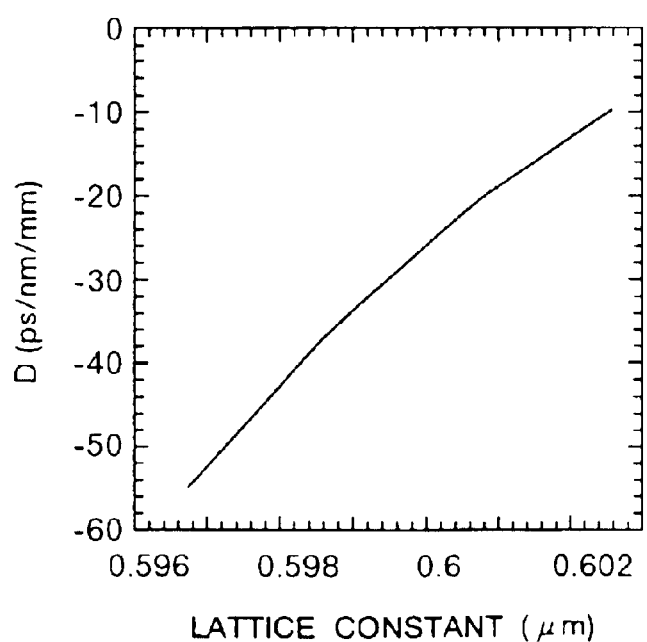
FIG. 12 is a diagram showing a change in dispersion value of a waveguide made of detects in photonic crystal in FIG. 11 at the time that a lattice constant a is changed.

FIG. 12 shows the manner in which dispersion changes when a lattice constant is changed. The vertical axis indicates a dispersion value (D) and the horizontal axis indicates a lattice constant (a). When the present method is used, a dispersion compensating value can be changed while the length x of a photonic crystal waveguide with defects, of dispersion compensating waveguides is being kept constant.

(Fourth Embodiment)

In the first through third embodiments, the plurality of waveguides fixed in dispersion value are prepared and switched over to change the dispersion values. A method of continuously changing dispersion values by one waveguide will be described below by way of example.

Figure 16A:
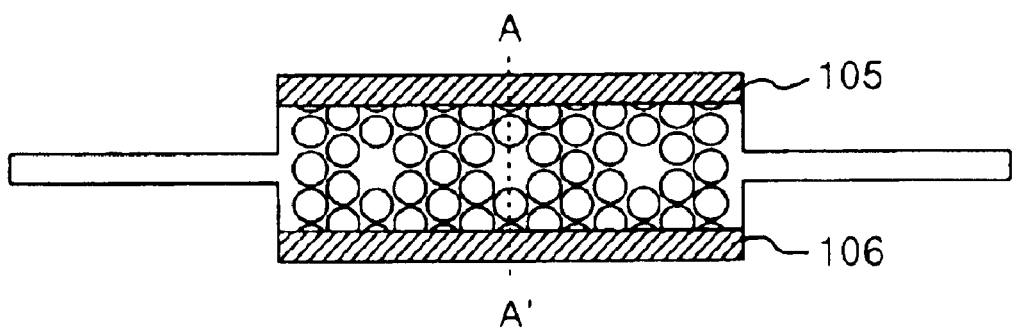
FIGS. 16a and 16b are an external view and a cross-sectional view for showing a continuous variable dispersion compensating waveguide in a fourth embodiment of the present invention, respectively.
Figure 16B:
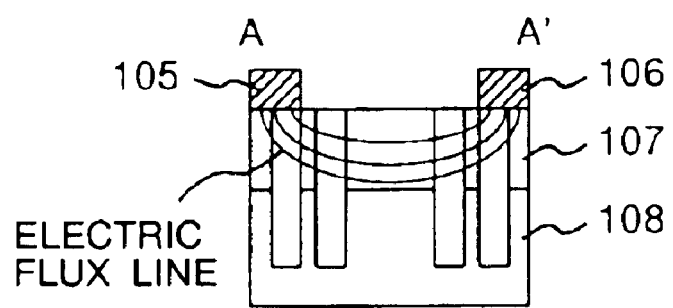

FIGS. 16a and 16b show a fourth embodiment of the present invention, and are an external view and a cross-sectional view of a photonic crystal waveguide with defects, respectively, which is variable in dispersion value according to the application of a voltage. In the present embodiment, as illustrated in FIG. 16a, a dispersion compensating waveguide comprises a waveguide made of defects in photonic crystal, a positive electrode 105, and a negative electrode 106. FIG. 16b is a cross-sectional view taken along A-A' of FIG. 16a. An $LiNbO_3$ layer 107 corresponding to a dielectric having a large electro-optical constant is successively laminated or stacked on an $SiO_2$ layer 108, and a two-dimensional photonic crystal with defects is patterned. Since the refractive index of $LiNbO_3$ is larger than that of $SiO_2$, the photonic crystal serves as a core layer of a slab structure which clads air and $SiO_2$.

Figure 17:
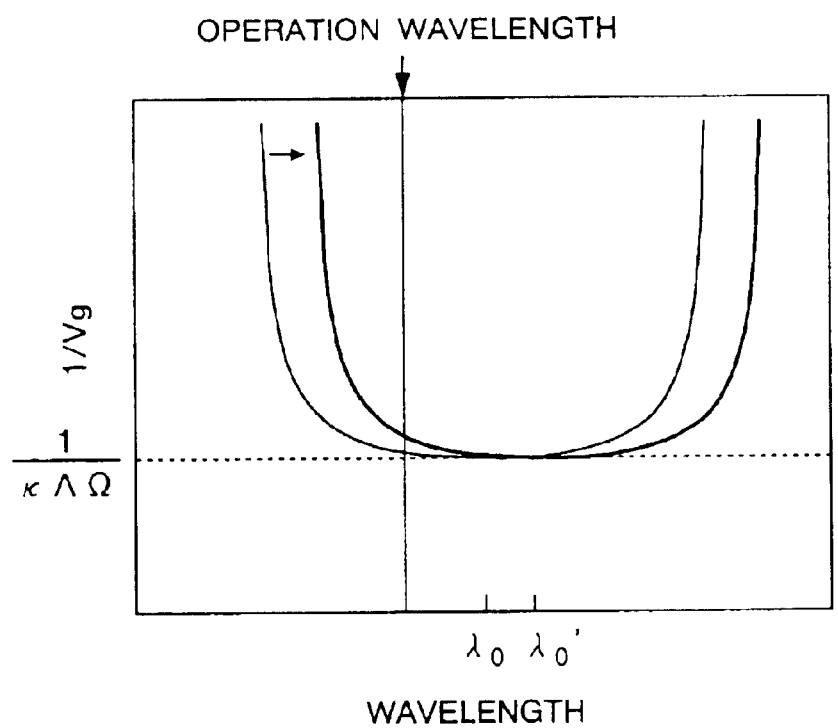
FIG. 17 is a diagram showing the dependence of a dispersion value of the dispersion compensating waveguide employed in the embodiment shown in FIG. 16 on a wavelength.

The principle of changing a dispersion value will next be described. When a voltage is applied or placed between the positive electrode 105 and the negative electrode 106, such an electric field as shown in FIG. 16b is applied so that the refractive index of the $LiNbO_3$ layer 107 changes. With the change in refractive index, a change occurs in the characteristic of light that propagates through coupled defects. FIG. 17 typically shows a change in wavelength dependent curve of 1/Vg at the voltage application. It is understood that the whole curve is shifted (as indicated by arrow →) by the application of the voltage so that the inclination of 1/Vg at the operation wavelength of signal light, i.e., the dispersion value changes. Since the amount of change in refractive index is determined according to the electric field, the dispersion value is controlled by the applied voltage.

The dispersion compensating waveguide according to the present embodiment as described above is capable of continuously changing the dispersion value according to the application of the voltage. It is needless to say that while $LiNbO_3$ is used in the present embodiment, a similar effect is obtained even if other non-linear optical materials large in electro-optical effect, a semiconductor, polymer, etc. are used.

(Fifth Embodiment)

Figure 18:
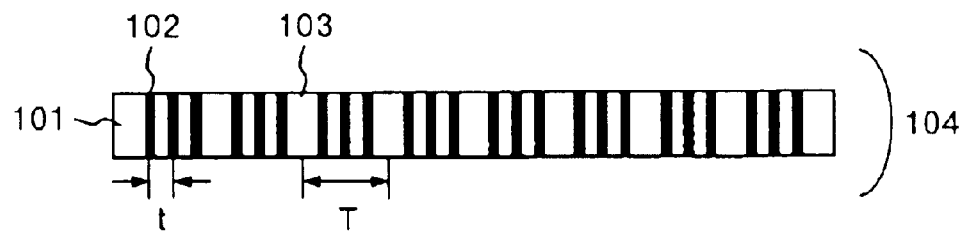
FIG. 18 shows a fifth embodiment of the present invention and is a conceptual diagram showing a dispersion compensating waveguide using a fiber grating.

FIG. 18 shows a fifth embodiment of the present embodiment and is a conceptual diagram of an example in which a fiber grating is used to configure a dispersion compensating waveguide. The normal fiber grating is an optical fiber in which the refractive index of a core is periodically modulated. Hence this can be regarded as a one-dimensional photonic crystal.

In the present embodiment, as shown in FIG. 18, higher-refractive-index portions or regions 102 each having a refractive index $\epsilon g$ (>$\epsilon c$) are provided in a core 101 of an optical fiber having a refractive index c in a cycle or period t and defects 103 are provided in a cycle or period T corresponding to an integral multiple of the period t to thereby form a fiber grating 104 with the defects. The fiber grating 104 is a one configuration example of a waveguide made of defects in one-dimensional photonic crystal. While the refractive index of the defect 103 is set equal to $\epsilon c$ in the present embodiment, it may be set to another refractive index. As a method of creating the fiber grating with the defects, which is employed in the present embodiment, the method of creating the normal fiber grating can be applied adequately.

(Sixth Embodiment)

A description will next be made of an optical transmission system to which a variable dispersion compensator according to the present invention is applied.

Figure 13:
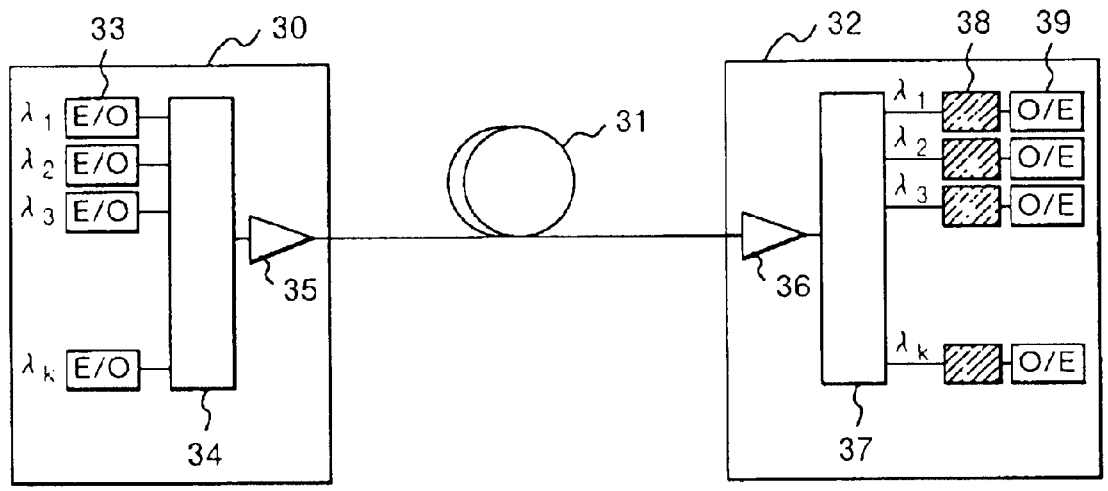
FIG. 13 shows a sixth embodiment of the present invention and is a diagram illustrating a configuration of a wavelength division multiplexing optical transmission system using a variable dispersion compensator.

FIG. 13 is a sixth embodiment of the present invention and shows a 40 Gbps/channel type wavelength division multiplexing optical transmission system using the variable dispersion compensator illustrated in the first embodiment. The present system comprises a transmitter 30, an optical fiber transmission path 31, and a receiver 32. The transmitter 30 comprises electro-optical converters (E/O) 33 provided every wavelengths (channels), a multiplexer 34, and a transmit amplifier 35. However, they will be enough if commonly-used ones are adopted. A wavelength to be used will be set to a band with 1.55 μm as the center. A dispersion shift fiber is used for the optical fiber transmission path 31, and a transmission distance thereof is 80 km.

The receiver 32 comprises a receive amplifier 36, a demultiplexer 37, a variable dispersion compensator 38 according to the present invention, which is described in the first embodiment, and an opto-electric converter (O/E) 39. The demultiplexer 37 divides a multiplexed and transmitted light pulse into respective wavelengths, and the variable dispersion compensator 38 effects optimum dispersion compensation for them at respective channels. The dispersion of the dispersion shift fiber is less than or equal to a few ps/nm/km at 1.53 μm to 1.6 μm. While a dispersion of about maximum ±200 ps/nm is done at the transmission distance of 80 km, its value varies according to each channel (wavelength). Since the variable dispersion compensator 38 has a variable width ±–160 ps/nm, and a resolution of 20 ps/nm as described in detail in the first embodiment, the variable dispersion compensator 38 is capable of substantially effecting dispersion compensation for all the channels.

(Seventh Embodiment)

Another embodiment of an optical transmission system to which a variable dispersion compensator according to the present invention is applied, will next be described.

Figure 14:
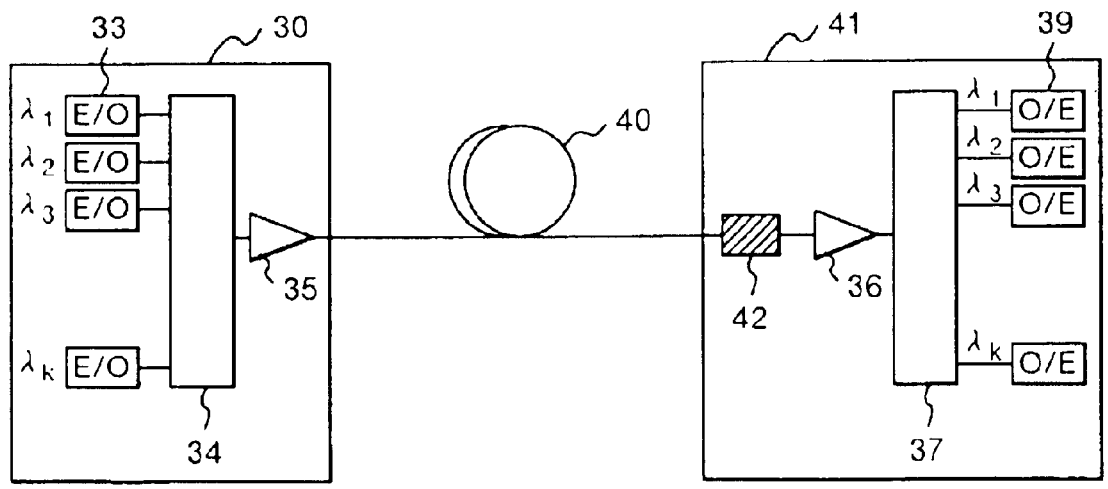
FIG. 14 illustrates a seventh embodiment of the present invention and is a diagram showing another configuration of a wavelength division multiplexing optical transmission system using a variable dispersion compensator.

FIG. 14 is a seventh embodiment of the present invention and shows a 10 Gbps/channel type wavelength division multiplexing optical transmission system using a variable dispersion compensator according to the present invention. The present system comprises a transmitter 30, an optical fiber transmission path 40, and a receiver 41. The transmitter 30 is similar to that illustrated in the fourth embodiment in configuration. As the optical fiber transmission path 40, a single mode fiber having a minimum dispersion region in a 1.3 μm band is used and a transmission distance thereof is 80 km.

Namely, the present system is a system used when large-capacity transmission is carried out according to a wavelength division multiplexing system using the already-existing single mode fiber. The receiver 41 comprises a variable dispersion compensator 42 according to the present invention, a receive amplifier 36, a demultiplexer 37, a variable dispersion compensator 42 described in the first embodiment, and an opto-electric converter (O/E) 39.

Figure 15:
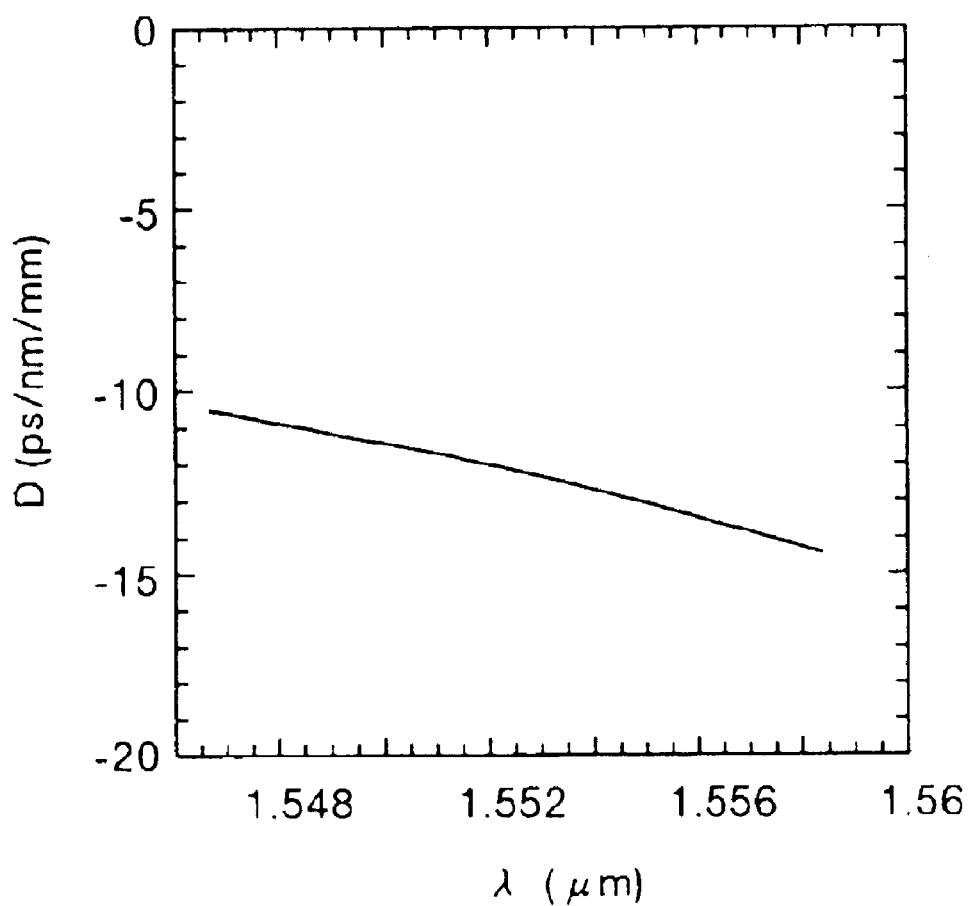
FIG. 15 is a diagram showing the dependence of a dispersion value of a dispersion compensating waveguide employed in the embodiment shown in FIG. 14 on a wavelength.

In the present system, the variable dispersion compensator 42 is placed in a stage preceding the demultiplexer 37, and collectively compensates for a plurality of channels. Therefore, design parameters for the variable dispersion compensation 42 are different from those employed in the first embodiment. Described specifically, a lattice constant a of a photonic crystal =0.585, κ=0.1 and Λ=6a√3. A dispersion value (D) at this time is shown in FIG. 15. This indicates a dispersion slope opposite in direction to a single mode fiber, and effective dispersion compensation is allowed.

(Eighth Embodiment)

While the fiber grating is used as the one-dimensional photonic crystal in the fifth embodiment, a similar effect is obtained even if periodic structures are introduced into a normal rectangular waveguide.

A one-dimensional periodic structure extending along the direction of propagation of light, and ununiform elements (defects) in the periodic structure are introduced in an Si three-dimensional waveguide formed on an SOI substrate to thereby configure a waveguide made of defects in photonic crystal, which functions as a dispersion compensating waveguide. Vertical holes are defined in a waveguide at predetermined intervals so that the one-dimensional periodic structure can be fabricated. Changing hole-to-hole intervals at specific positions at this time yields the introduction of defects. The defects are provided at equal intervals, and each of the defects is formed as a structure wherein an integral number of holes are interposed between the defects.

A constituent material of a waveguide is not limited to Si. As the constituent material, another semiconductor, a dielectric or polymer may be used. While a lower refractive-index medium makes use of air in the present embodiment, another lower refractive-index medium may fill in the waveguide.

As the periodic structure of the waveguide, a structure for periodically modulating a waveguide width, etc. are considered in addition to the structure having the holes defined therein.

The dispersion compensating waveguide employed in the present embodiment is also capable of constituting a variable dispersion compensator. A positive electrode is formed on one side of the waveguide, and a negative electrode is placed on the other side thereof. When a voltage is placed between both electrodes, an electric field is applied to the waveguide and hence a refractive index changes due to an electro-optical effect. With the change in the refractive index, a propagation characteristic of light changes and a dispersion value also changes. Thus, the dispersion value can be controlled by an electric field applied to the corresponding electrode.

Further, a similar effect can be obtained even in the case of a structure wherein the refractive index of a substance which encircles the periphery of the waveguide, is changed without changing the refractive index of the waveguide.

The aforementioned embodiment using the photonic crystal has principally described, as an example, the case in which the two-dimensional triangular lattice is used in the structure of the photonic crystal. As the structure of the photonic crystal, there have been proposed various structures such as a one-dimensional structure, a two-dimensional structure and a three-dimensional structure. It is needless to say that a similar effect is obtained even if any of them is used.

According to the present invention as described above, a dispersion compensator can be obtained which is ultra small in size and low in cost and capable of varying dispersion compensating values. Further, the use of the dispersion compensator according to the present invention makes it possible to construct an optical transmission system which is low in cost and high in reliability.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. The dispersion compensator for compensating for a wavelength dispersion of a transmission medium lying in an optical pulse transmission path, comprising:

at least one dispersion compensating waveguide formed by a photonic crystal in which ununiform elements are introduced into periodic structures of at least two or more types of mediums different in refractive index;

whereby a dispersion property of light that propagates through the ununiform elements of the photonic crystal, is used to compensate for the waveform dispersion, wherein the ununiform elements of the photonic crystal and the periodic structures lying therearound form coupled microcavities, and the microcavities are used to compensate for the wavelength dispersion.

2. The dispersion compensator for compensating for a wavelength dispersion of a transmission medium lying in an optical pulse transmission path, comprising:

at least one dispersion compensating waveguide formed by a photonic crystal in which ununiform elements are introduced into periodic structures of at least two or more types of mediums different in refractive index;

whereby a dispersion property of light that propagates through the ununiform elements of the photonic crystal, is used to compensate for the waveform dispersion, wherein the length of an occupied waveguide portion of the photonic crystal in the dispersion compensating waveguide is changed to thereby compensate for the wavelength dispersion.

3. The dispersion compensator for compensating for a wavelength dispersion of a transmission medium lying in an optical pulse transmission path, comprising:

at least one dispersion compensating waveguide formed by a photonic crystal in which ununiform elements are introduced into periodic structures of at least two or more types of mediums different in refractive index;

whereby a dispersion property of light that propagates through the ununiform elements of the photonic crystal, is used to compensate for the waveform dispersion, wherein a lattice constant of the photonic crystal in the dispersion compensating waveguide is changed to thereby compensate for the wavelength dispersion.

4. A dispersion compensator comprising:

light input signal switching means; and a plurality of dispersion compensating waveguides which are placed side by side on the same plane and have different wavelength dispersions and which respectively have coupled microcavities;

whereby the dispersion compensating waveguides are selected by the switching means to thereby control a value for compensating for each wavelength dispersion in an optical transmission path.

5. A dispersion compensator, at least comprising:

an input-side optical system;

a waveguide array comprising a plurality of dispersion compensating waveguides respectively having different wavelength dispersions;

a drive unit for driving the waveguide array; and an output-side optical system, wherein the dispersion compensating waveguides respectively have coupled microcavities, and wherein the waveguide array is shifted by the drive unit to thereby select the dispersion compensating waveguide through which an optical pulse passes, whereby the dispersion compensating waveguide controls a value for compensating each wavelength dispersion in an optical transmission path.

6. The dispersion compensator according to claim 4, wherein the coupled microcavities are formed by each of photonic crystals in which ununiform elements are respectively introduced in periodic structures of at least two types of mediums different in refractive index.

7. The dispersion compensator according to claim 6, wherein the lengths of occupied waveguide portions of the photonic crystals in the respective dispersion compensating waveguides are rendered different to thereby control values for compensating for the wavelength dispersions.

8. The dispersion compensator according to claim 6, wherein lattice constants of the photonic crystals in the respective dispersion compensating waveguides are rendered different to thereby control values for compensating for the wavelength dispersions.

* * * * *